United States Patent

[11] 3,632,151

| [72] | Inventor | Lawrence F. Wosnitzky<br>729 2nd Street North, Texas City, Tex. 77590 |
|---|---|---|
| [21] | Appl. No. | 829,474 |
| [22] | Filed | June 2, 1969 |
| [45] | Patented | Jan. 4, 1972 |

[54] FISH-CLAMPING IMPLEMENT
2 Claims, 5 Drawing Figs.

[52] U.S. Cl. ..................................................... 294/16
[51] Int. Cl. ..................................................... B65g 7/12
[50] Field of Search ............................................. 294/16, 13, 99, 106, 33, 28

[56] References Cited
UNITED STATES PATENTS

| 172,135 | 1/1876 | Luks | 294/28 |
| 2,358,682 | 9/1944 | Benton et al | 294/104 |
| 2,534,512 | 12/1950 | Fulton | 294/28 |
| 1,784,112 | 12/1930 | Rosano | 294/106 X |
| 2,757,951 | 8/1956 | Benton | 294/16 |
| 2,847,693 | 8/1958 | Guinn | 294/106 X |
| 2,881,022 | 4/1959 | Brust | 294/16 |
| 3,169,034 | 2/1965 | Epstein | 294/16 |

*Primary Examiner*—Richard E. Aegerter
*Assistant Examiner*—Douglas D. Watts
*Attorneys*—Clarence A. O'Brien and Harvey B. Jacobson ABSTRACT: A wholly portable manually usable implement for clamping and holding a fish by its tail while it is being scaled, skinned, dressed, cut up for cooking or while carrying it about. It comprises a pair of simple hingedly united U-shaped frames, or units provided with confronting plates whose lengthwise edges are provided with tail-gripping, antislipping teeth.

PATENTED JAN 4 1972
3,632,151
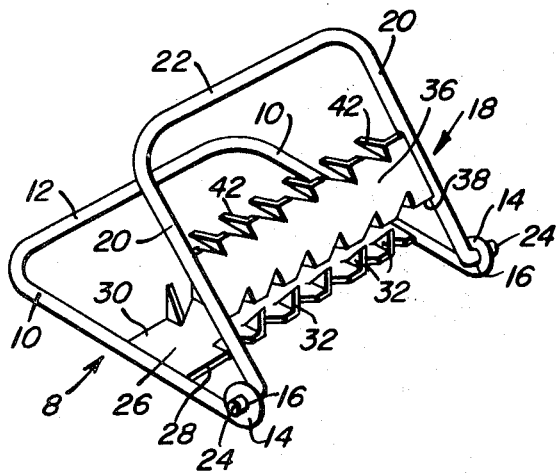
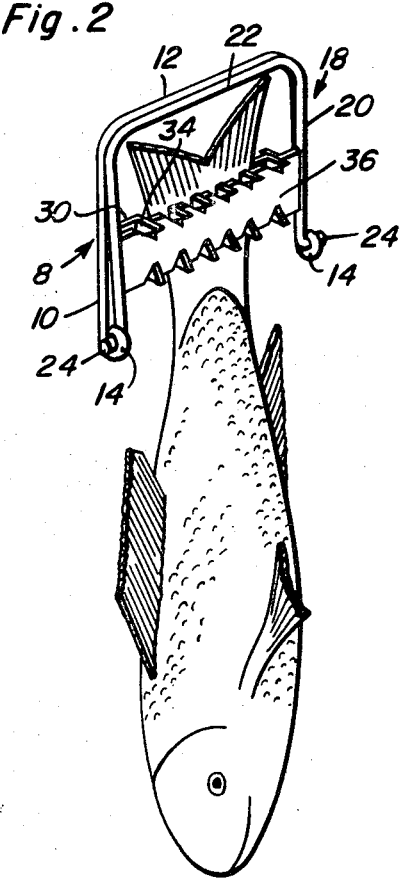
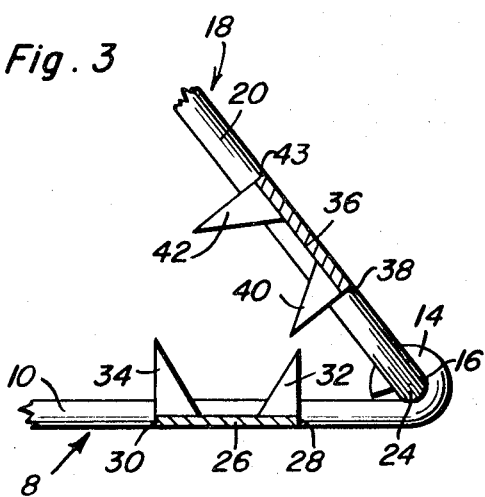
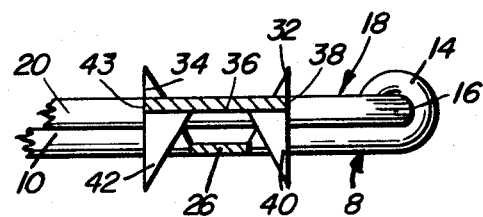
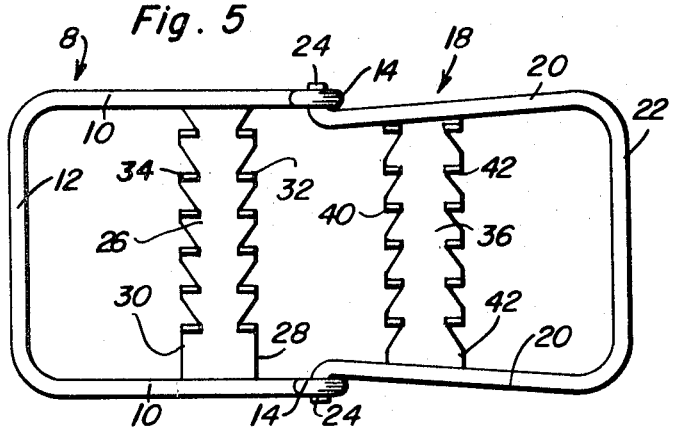
Lawrence F. Wosnitzky
INVENTOR.
BY Lawrence A. O'Brien
and Harvey B. Jacobson
Attorneys 3,632,151

FISH-CLAMPING IMPLEMENT

This invention relates to a fish-clamping implement which embodies unique features which cooperate in providing a self-contained adaptation which lends itself to feasible use when the user is called upon to reliably hold a fish for whatever purposes desired.

As will be hereinafter more fully appreciated the herein disclosed implement is simple in construction, reliably strong, easy to use, and economical to manufacture. Wholly portable and manually usable with one hand or both hands, as the case may be, it does not have to be mounted or anchored on a baseboard or panel, as is usually the case. It is such in shape, size and compact character that it can be stored without difficulty in many types of tackle boxes. The rows of teeth along the edges of the clamping plates facilitate confident holding and carrying. The fact that the openable and closeable toothed clamping units are operated and controlled by regulatable hand pressure permits the user to readily flip and turn the clamped fish over for cleaning in a manner to save time and comply with the wishes of the user. Then, too, no springs or latching and retaining devices are required.

Briefly the implement is such in construction and capability that it is not only freely portable but constitutes an innovation in that it enables the user to employ both hands or one hand, as desired, when properly using the hinged toothed component parts. More specifically it comprises a first U-shaped handling unit embodying a pair of spaced parallel coplanar legs or limbs having corresponding ends joined by an intervening bight portion, said legs having free ends which are coiled or bent upon themselves and terminate in eyes. The eyes of the respective limbs are spaced apart in alignment and constitute a pair of companion bearings. A second U-shaped handling unit is provided and it is similar in construction and comparable in size and shape with the first unit and it likewise embodies a pair of spaced parallel coplanar legs or limbs which have free ends bent or directed outwardly at right angles to provide pintles. These pintles are aligned with each other and are hingedly mounted in the respectively cooperable bearings so that both units can be overlapped when desired or alternatively, swung apart into angular relationship at will to facilitate inserting and removing the fish. The median portions of the legs of the respective units are provided with plates which are in turn equipped with toothed edge portions, the teeth being arranged and capable of clamping and holding the tail of the fish while it is acted upon for whatever purpose desired.

In carrying out the principles of the invention the two plates are integral with the limbs or legs of the respective U-shaped handling units or handles. These plates are rectangular in plan, span the space between the coacting legs and the tongues are struck-out from the longitudinal edge portions and are not only arranged in longitudinally spaced rows but are properly staggered to avoid collision of the tongues when the two plates approach each other, that is, come together in adjacent clamping relationship.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of a fish-clamping implement constructed in accordance with the principles of the present invention with the first and second U-shaped units or handles spaced apart for reception of the tail of a fish.

FIG. 2 is a view in perspective on an smaller scale and showing how the units and the plates come together to bring the respective sets or rows of teeth in play to impale or otherwise clampingly grip the tail of the fish.

FIG. 3 is an enlarged fragmentary detail sectional view emphasizing the construction and coaction of the toothed plates.

FIG. 4 is a view similar to FIG. 3 and showing the first and second U-shaped units closed, that is, in overlapping relationship with the plates together and the respective sets of teeth coacting with each other, and FIG. 5 is a plan view showing the two U-shaped units or handles spread apart in wide open relationship merely to show the construction and relationship of the component parts.

Referring in particular to FIGS. 1 and 5, the first U-shaped unit or handle is denoted by the numeral 8. It comprises a pair of like-spaced parallel coplanar legs or limbs 10 having corresponding left-hand ends connected by an intervening bight portion 12. The free right-hand ends of the arms or legs are bent upon themselves to provide eyes 14 which in turn provide bearings 16. The complemental second U-shaped handling unit or handle is denoted by the numeral 18 and it is much the same in construction as the first unit 8. This is to say, it comprises a pair of spaced parallel coplanar legs or limbs 20 having corresponding ends joined by an intervening bight portion 22. While the free ends of the arms or limbs 20 can be joined by a rivet or equivalent mechanical means to the bearings the free ends are preferably laterally directed outwardly in axial alignment and provide assembling and hinging pintles 24. These pintles are aligned with and properly journaled in the bearings 16.

Both units or handles are preferably but not necessarily constructed from a single length of appropriate rod stock which is bent upon itself between its ends to provide the U-shaped configuration.

The first unit 8, also referred to as the bottom unit in certain of the views of the drawings is provided at the opposite intermediate portions of the legs 10 with a substantially rectangular plate 26. This plate is rigid and is basically rectangular in plan and is of prerequisite cross section and length that it can be welded in place between the legs 10. One lengthwise edge portion 28 is spaced from the eyes or bearings 14. The other longitudinal edge 30 is spaced a requisite distance from and is parallel with the bight portion 12. Both edges are provided with struck-out substantially triangulate tongues which constitute teeth. The teeth of one row are denoted at 32 (FIG. 3) and those of the other row at 34. The teeth 32 can be slightly smaller if desired than the teeth 34. In any event the respective rows of teeth are disposed at longitudinally spaced points to serve the impaling and clamping results evident from FIG. 2. The companion or complemental plate 36 is likewise basically rectangular in shape and it too is mounted similarly between the legs 20. This plate has one edge 38 provided with struck-out triangulate longitudinally spaced teeth 40. The other edge 43 is provided with triangulate teeth 42. These teeth are in proper-spaced row alignment and they are staggered with respect to the teeth 32 and 34 so that the respective sets of teeth do not collide but come together in coacting relationship as brought out in FIGS. 2 and 4.

It is believed that the construction, orientation and cooperation of the component parts is evident from the views of the drawing and that the principal manner of use wherein the clamping teeth come into play in clasping and holding the fishtail is evident from FIG. 2. A more extended description is believed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A portable manually manipulatable fishtail gripping and clamping implement comprising a first U-shaped member providing a handling unit, said unit embodying a pair of spaced parallel coplanar legs having free ends terminating in opposed and cooperatively aligned eyes providing complemental bearings, a second U-shaped member also providing a handling unit structurally similar in size and shape to said first U-shaped member and likewise embodying a pair of spaced parallel coplanar legs which are swingable toward and from and are cooperatively alignable with said first named legs and have free ends terminating in outstanding assembling pintles, said pintles being aligned with and hingedly mounted in their respectively cooperable bearings whereby the respective bight portions of said units can be manually gripped and swung by hand toward and from each other, a pair of like companion plates, each of said plates being rectangular in plan, being flush with and spanning the space between cooperable legs and having end portions rigidly joined to interior coacting median portions of their coordinating legs, said plates having tongues struck out from and disposed at right angles to the plates, the tongues on one plate being directed toward and staggered with respect to the tongues on the other plate in a manner to avoid collision of the respective tongues and also to permit said tongues to intermesh when the two plates are caused to come together in clamping relationship.

2. The implement defined in and according to claim 1, and wherein each U-shaped member is formed from a single length of rod stock which is bent upon itself intermediate its respective ends to assume the required U-shaped configuration.

* * * * *